United States Patent [19]
Takenoshita et al.

[11] Patent Number: 5,354,039
[45] Date of Patent: Oct. 11, 1994

[54] GAS DISPERSION NOZZLE APPARATUS FOR FLUIDIZED BED FURNACE

[75] Inventors: Hidemitsu Takenoshita; Hisashi Hattori; Yoichiro Hanada, all of Hirakata, Japan

[73] Assignee: Kabushiki Kaisha Komatsu Seisakusho, Japan

[21] Appl. No.: 159,936

[22] Filed: Dec. 1, 1993

Related U.S. Application Data

[63] Continuation of Ser. No. 340,005, filed as PCT/JP87/00615, Aug. 19, 1987 published as WO88/02839, Apr. 21, 1988, abandoned.

[30] Foreign Application Priority Data

Oct. 14, 1986 [JP] Japan .................... 61-242055

[51] Int. Cl.$^5$ ............................ F27B 15/00
[52] U.S. Cl. ................... 266/251; 266/172; 432/58
[58] Field of Search ............ 266/249, 251, 44, 172; 432/58

[56] References Cited

FOREIGN PATENT DOCUMENTS

| | | |
|---|---|---|
| 48-3750 | 2/1973 | Japan . |
| 57-41573 | 3/1982 | Japan . |
| 57-117013 | 7/1982 | Japan . |
| 1133796 | 8/1986 | Japan . |

*Primary Examiner*—Scott Kastler
*Attorney, Agent, or Firm*—Ronald P. Kananen

[57] ABSTRACT

A gas diffusing nozzle device for a fluidized bed furnace having high thermal resistance and durability especially, in a high-temperature environment and capable of being manufactured at a low cost, fluidizing a fluid layer uniformly using a fluidized gas jet with a low pressure loss and controlling the flow rate of the fluidized gas jet at the outer circumferential and central portions of the interior of a retort (11) in an arbitrary and individual manner. This device is provided with a circumferential gas supply pipe (19), a central gas supply pipe (24), and a circumferential gas diffusing nozzle section (14) and a central gas diffusing nozzle section (15) respectively connected to these two gas supply pipes. Each of the gas diffusing nozzle sections has a plurality of nozzle pipes (16b, 22) with a plurality of downwardly directed fluid gas ejection ports (17) formed in the lower surfaces thereof, and at least one ring-shaped nozzle pipe (16a, 21) joined to the free ends of these nozzle pipes.

10 Claims, 5 Drawing Sheets

GAS DISPERSION NOZZLE APPARATUS FOR FLUIDIZED BED FURNACE

This application is a continuation of application Ser. No. 07/340,005, filed as PCT/JP87/00615, Aug. 19, 1987 published as WO88/02939, filed Apr. 21, 1988, now abandoned.

TECHNICAL FIELD OF THE INVENTION

This invention relates to a gas dispersion nozzle apparatus, and more particularly to a gas dispersion nozzle apparatus mounted in a retort for a fluidized bed furnace used for heating and heat treatment of metals so as to inject air or a heat treating gas (referred to simply as a treating gas hereinbelow) for fluidizing the fluidized bed located in the retort into the latter.

BACKGROUND TECHNIQUE OF THE INVENTION

Gas dispersion nozzle apparatuses for use in fluidized bed furnaces are required to have the following performances.

(1) They have high heat-resistance and durability (2) They are capable of uniformly fluidizing a fluidized bed which is comprised of refractory particles in a retort at every temperature, and (3) They are capable of minimizing the heat flow from the lower portion of the retort.

As one of gas dispersion nozzle apparatuses which have so far been used, there is known an apparatus wherein a dispersion plate made of porous ceramic is fixedly secured by bonding by means of an adhesive below the inner bottom surface of a retort in such a manner that it extends in substantially parallel relationship with the inner bottom surface of the retort so as to define a space between it and the inner bottom surface, and a nozzle apparatus having a nozzle for injecting air or a treating gas is provided in the space defined between the lower surface of the gas dispersion plate and the inner bottom surface of the retort.

The points at issue of this prior art example are: (1) the gas dispersion is liable to break or crack since it is made of ceramic, (2) to maintain the fixing of the gas dispersion plate to the inner side wall surface of the retort, it is necessary to cool down the retort from the outer periphery thereof so as to prevent the melting of the adhesive by heat, thus causing heat losses, and (3) in order to protect the applied adhesive, the internal temperature of the retort must be lowered to 700° C. prior to stopping the fluidization of the fluidized bed, which results in lossess in operation time and heat, etc.

Another prior art gas dispersion nozzle apparatus devised to solve the points at issue of the above-mentioned first prior art example comprises a gas dispersion plate fixedly secured below the inner side wall surface of a retort in parallel with the inner bottom surface thereof to prevent the applied adhesive from melting by heat, and a multiplicity of nozzle tubes mounted, respectively, in a plurality of longitudinal through-holes formed in the gas dispersion plate, each of the nozzle tubes having a plurality of horizontal nozzles located above the dispersion plate.

This second prior art example has also the following points at issue.

(1) Many complicated working processes are required to fabricate the nozzle tubes, thus rendering the cost of the gas dispersion nozzle apparatus expensive.

(2) Because of high pressure losses in the nozzle tubes, provision of a blower having a large capacity is required, and in case it is used in a heat-circulation type fluidized bed, the circulation efficiency thereof is poor.

(3) Since the injection nozzles are located horizontally, fluidizing particles are liable to make an ingress into the nozzles causing frequent clogging of the nozzles with the particles.

(4) Since the gas dispersion plate has a plurality of nozzle tube mounting holes formed therein and supports the weight of the fluidizing particles, the maximum allowable internal temperature of the retort is limited, to 1,100° C., and therefore the apparatus cannot be used at temperatures exceeding it, etc..

DISCLOSURE OF THE INVENTION

The present invention has been made in view of the above-mentioned circumstances in the prior art and in order to solve the points at issue of the prior art.

One object of the present invention is to provide a gas dispersion nozzle apparatus for use in a fluidized bed furnance which is simple in construction and replacement of which can be made readily and which is excellent in heat-resistance and durability and cheap in cost.

Another object of the present invention is to provide a gas dispersion nozzle apparatus wherein the maximum allowable internal temperature of a retort is 1,300° C., and uniform fluidization of a fluidized bed can be achieved at every temperature up to 1,300° C.

A further furhter object of the present invention is to provide a gas dispersion nozzle apparatus wherein the pressure losses in fluidizing air or a treating gas to be injected into a retort is limited, and which can also be used for a heat-circulation type fluidized bed furnace.

A still further object of the present invention is to provide a gas dispersion nozzle apparatus which is subjected to less adverse effect by fluidizing particles.

A further object of the present invention is to provide a gas dispersion nozzle apparatus wherein a heat insulation layer can be formed between the gas dispersion nozzle apparatus and the inner bottom surface of the retort.

A further object of the present invention is to provide a gas dispersion nozzle apparatus wherein the flow rate of fluidizing air or a treating gas in the retort can be controlled in any desired manner and individually in the outer peripheral zone and the central zone thereof, respectively.

To achieve the above-mentioned objects, according to the first aspect of the present invention, there is provided a gas dispersion nozzle apapratus for use in a fluidized bed furnace, characterized in that it includes a gas supply pipe means whose upper end is closed and whose lower end is connected to a pipeline installed outside the bottom portion of a retort and which extends vertically through the central part of the inner bottom surface of the retort; and a gas dispersion pipe means consisting of a plurality of nozzle pipes each having a plurality of downward gas nozzles formed in the longitudinal direction thereof, said nozzle pipes being connected to said gas supply pipe means so as to communicate with the latter in such a manner that they extend to a predetermined position near the inner side wall surface of the retort at a level spaced away from the inner bottom surface of the retort and in parallel relationship with the inner bottom surface.

In the gas dispersion nozzle apparatus as set forth in the first aspect of the present invention, the above-mentioned gas dispersion pipe means comprises a plurality of the above-mentioned nozzle pipes extending radially from the above-mentioned gas supply pipe means or those extending from the gas supply pipe means at right angles thereto and in parallel relationship with one another.

Further, in the gas dispersion nozzle apparatus as set forth in the first aspect of the present invention, the above-mentioned gas dispersion pipe means has also near the inner side wall surface of the retort at least one ring-shaped pipe having a plurality of downward gas nozzles formed through the lower surface of the retort in the circumferential direction thereof.

To achieve the above-mentioned objects of the present invention, according to the second aspect of the present invention, there is provided a gas dispersion nozzle apparatus for use in a fluidized bed furnace, characterized in that it includes a central zone gas supply pipe means whose upper end is closed and whose upper end is connected to a pipeline installed outside the bottom portion of a retort and which extends vertically through the central part of the inner bottom surface of the retort; an outer peripheral zone gas supply pipe means whose upper end is closed and whose lower end is connected to a pipeline installed outside the bottom portion of the retort and which extends vertically through the bottom portion of the retort at a position somewhat nearer the inner side wall surface of the retort than the central zone of the inner bottom surface thereof; an outer peripheral zone gas dispersion pipe means consisting of a plurality of nozzle pipes each having a plurality of downward gas nozzles formed in the longitudinal direction thereof, said nozzle pipes of the outer peripheral zone gas dispersion pipe means being connected to said outer peripheral zone gas supply pipe means so as to communicate with the latter in such a manner that they extend to a predetermined position near the inner side wall surface of the retort at a level spaced away from the inner bottom surface of the retort and in parallel relationship with the inner bottom surface; a central zone gas dispersion pipe means consisting of a plurality of nozzle pipes each having a plurality of downward gas nozzles formed in the longitudinal direction thereof, said nozzle pipes of the cnetral zone gas dispersion pipe means being connected to said central zone gas supply pipe means so as to communicate with the latter in such a manner that they extend to a predetermined intermediate position between the central part of the retort and the inner side wall surface thereof at a level spaced away from the inner bottom surface of the retort and in parallel relationship with the inner bottom surface; and a means for controlling the flow rate of a fluidizing gas to be supplied into said central zone gas supply pipe means and said outer peripheral zone gas supply pipe means, respectively, based on the detected internal temperature of the retort.

In the gas dispersion nozzle apparatus as set forth in the second aspect of the present invention, the above-mentioned outer peripheral zone gas dispersion pipe means and the central zone gas dispersion pipe means each consist of a plurality of said nozzle pipes which extend from the outer peripheral zone gas supply pipe means and the central zone gas supply pipe means, respectively, at right angles thereto and in parallel relationship with one another, and which are located so as to deviate in position with one another in the vertical and horizontal directions to thereby avoid their mutual interference.

Further, in the gas dispersion nozzle apparatus as set forth in the second aspect of the present invention, the above-mentioned outer peripheral gas dispersion pipe means has also at least one ring-shaped pipe having a plurality of downward gas nozzles formed in the circumferential direction thereof in the vicinity of the inner side wall surface of the retort, and side central zone gas dispersion pipe means has also at least one ring-shaped pipe having a plurality of downward gas nozzles formed in the circumferential direction thereof in an intermediate portion between the central part of the retort and the inner side wall surface thereof.

The above and other advantages, aspects and objects of the present invention will become apparent to those skilled in the art by making reference to the following description and the accompanying drawings in which preferred embodiments incorporating the principles of the present invention are shown by way of example only.

DETAILED DESCRIPTION OF PREFERRED EMBODIMENTS

A first embodiment of the gas dispersion nozzle apparatus according to the present invention will first be described below with reference to FIGS. 1 to 4.

Figure 1:
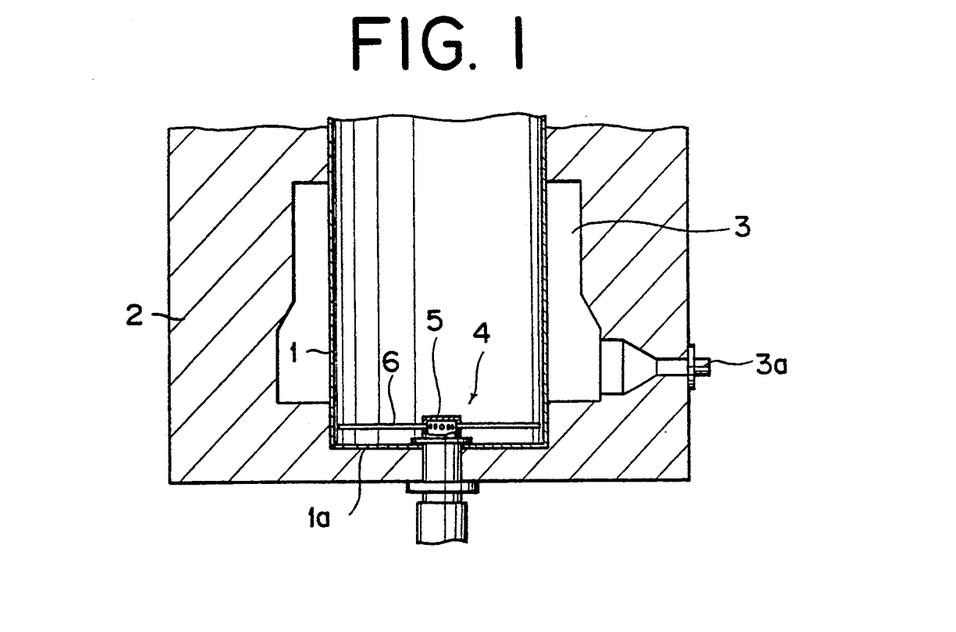
FIG. 1 is a schematic, front and longitudinal sectional view of a fluidized bed furnace comprising one embodiment of the gas dispersion nozzle apapratus according to the present invention.
Figure 2:
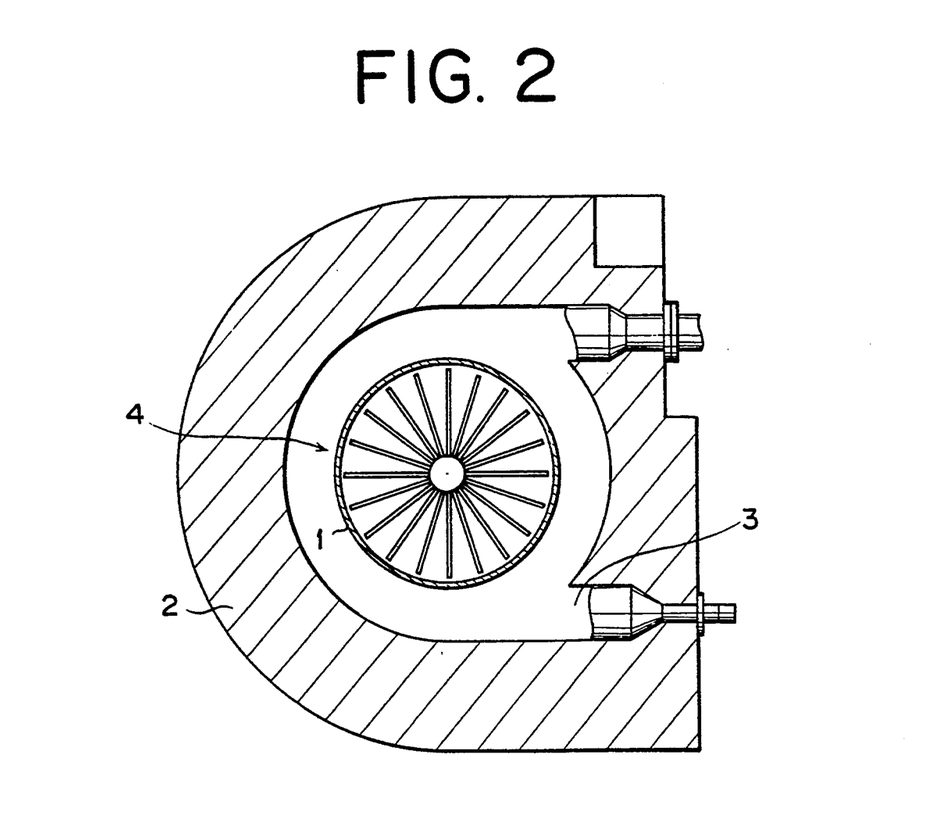
FIG. 2 is a schematic, plan and cross-sectional view of the fluidized bed furnace shown in FIG. 1.
Figure 3:
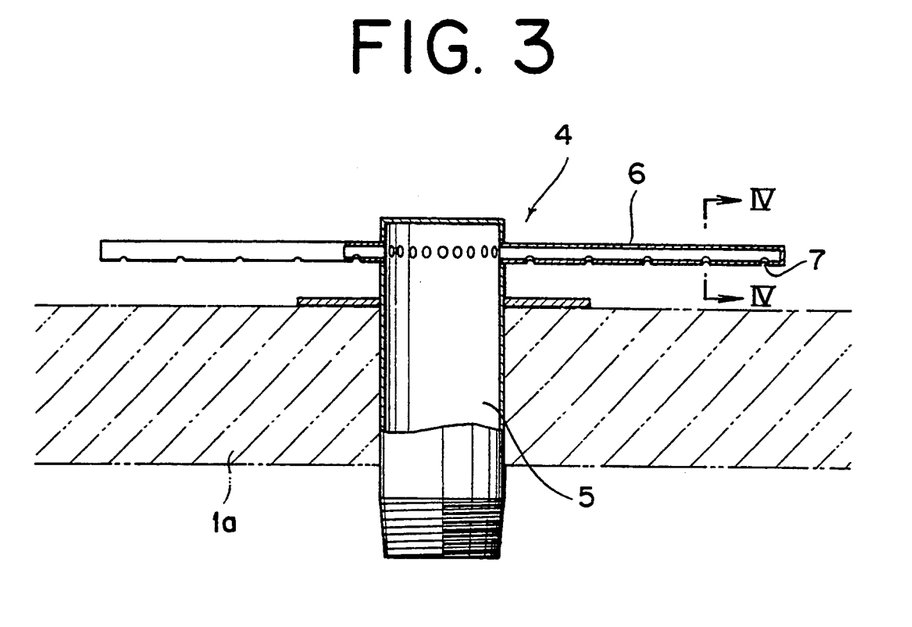
FIG. 3 is a schematic, enlarged plan and longitudinal sectional view of one embodiment of the gas dispersion nozzle apparatus shown in FIG. 1.
Figure 4:
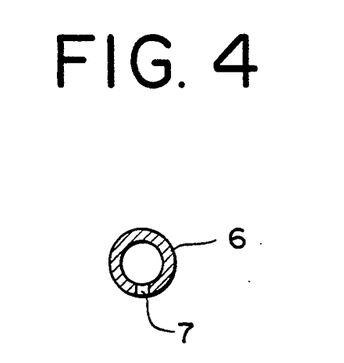
FIG. 4 is an enlarged sectional view taken along line IV—IV in FIG. 3.

In the drawings, reference numeral 1 denotes a retort surrounded and supported by a heat-insulating material 2, a combustion chamber 3 defined around the lower portion of the retort 1, and a burner 3a. The above-mentioned retort 1 has a required amount of fluidizing particles, not shown, disposed therein. Reference numeral 4 denotes a gas dispersion pipe section provided in the bottom portion of the retort 1. This gas dispersion pipe section 4 comprises a central gas supply pipe 5 located in the central part of the bottom portion of the retort 1, and a plurality of redially extending nozzle pipes 6 attached to the central gas supply pipe 5. The central gas supply pipe 5 extends through the retort 1, and its upper end is closed and its lower end is connected to a pipeline installed outside the fluidized bed furnace. Further, the nozzle pipe 6 is attached to the central gas supply pipe 5 at a position slightly spaced away from the bottom surface of the retort 1. Each of the nozzle pipes 6 has a plurality of downward nozzle holes 7 formed through the lower wall thereof at intervals of a proper spacing, for example, 30 mm in the longitudinal direction thereof, as shown in FIG. 3.

In the above-mentioned arrangement, the fluidizing gas which flows into the central gas supply pipe 5 is injected from the latter through the nozzle holes 7 formed in each of the nozzle pipes 5 towards the bottom surface of the retort 1. The thus injected fluidizing gas will strike against the inner bottom surface of the retort 1 and turn reversely and move upwards thereby fluidizing the fluidizing particles during their upward movement.

Figure 5:
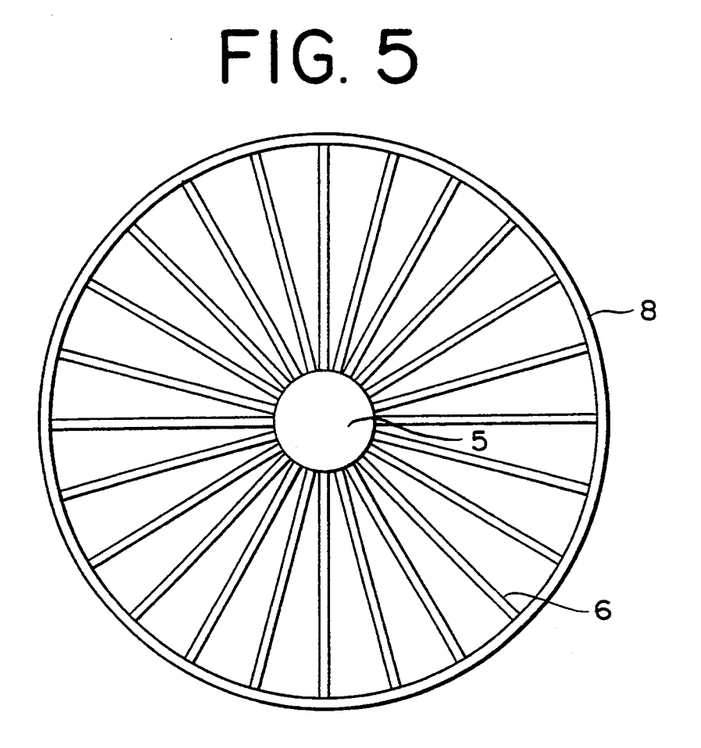
FIGS. 5 and 6 are a schematic plan view and a schematic, partially broken front view, respectively, showing other modifications.

In case the diameter of the retort 1 is great, a satisfactory fluidization in the wall surface portion cannot be achieved only by means of the radially extending nozzle pipes 6 as shown in the above-mentioned embodiment. Therefore, a modified embodiment as shown in FIG. 5 can be effectively used wherein the leading ends of each of the radially extending nozzle pipes 6 are connected to a ring-shaped pipe 8 and the pipe 8 has also a plurality of downward nozzle holes formed through the lower portion thereof and at intervals of a proper spacing along the circumference thereof.

Figure 6:
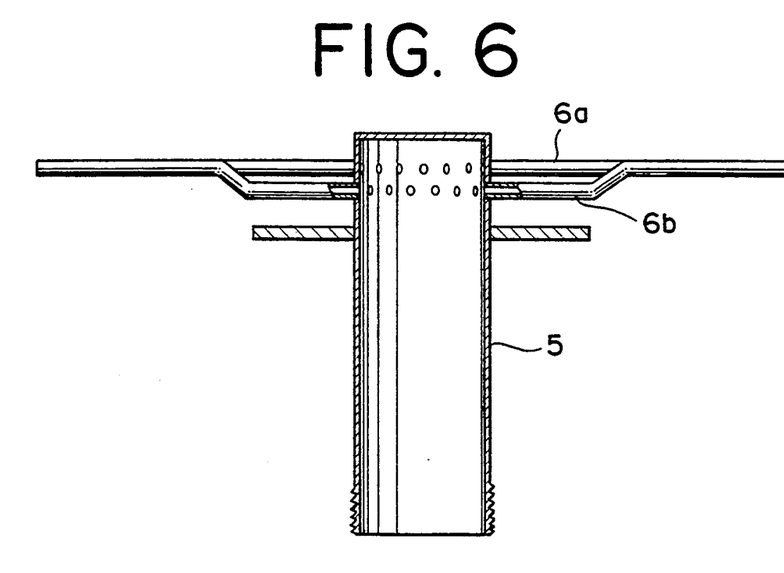

Further, in case the diameter of the retort 1 is greater than the above-mentioned case, another modified embodiment is effectively used wherein straight nozzle pipes 6a and stepped nozzle pipes 6b are connected in order to increase the number of the nozzle pipes 6 in such a manner that they alternate in the horizontal direction and deviate from one another in the vertical direction, as shown in FIG. 6, to thereby avoid their mutual interference.

Figure 7:
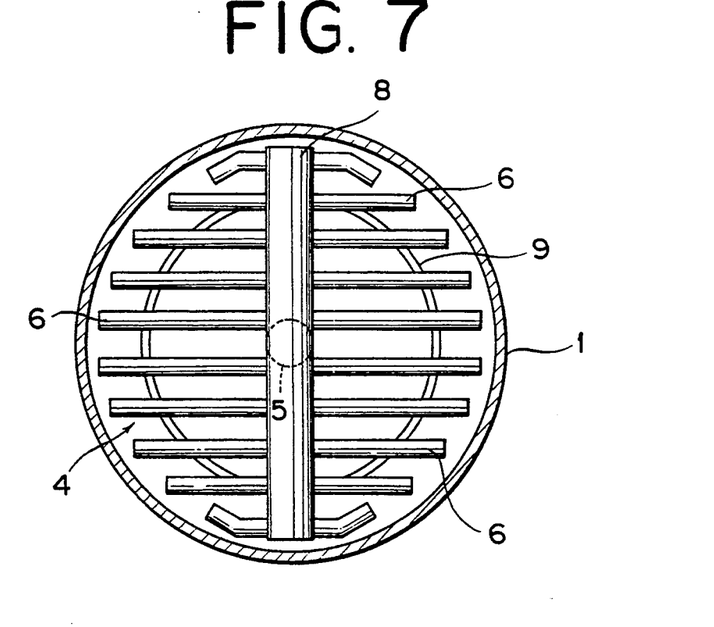
FIG. 7 is a schematic plan view showing another version or modification of the gas dispersion nozzle apparatus according to the present invention.

Another modification of the above-mentioned first embodiment is shown in FIG. 7.

According to this modified embodiment, there is shown a gas dispersion nozzle section 4 wherein a connection pipe 8 with a large diameter extending through the centre of the retort 1 is connected to a central gas supply pipe 5 so as to communicate with the latter, and a plurality of nozzle pipes 6 are connected to the connection pipe 8 so as to communicate with the latter and at right angles to the latter and in parallel relationship with one another, each of the nozzle pipes 6 having a large number of downward nozzle holes 7 formed through the lower wall thereof. Further, reference numeral 9 denotes a nozzle bed installed on the inner bottom surface of the retort 1 so as to support the nozzle pipes 6.

Since the above-mentioned gas dispersion nozzle apparatus according to the first embodiment can inject the fluidizing gas uniformly around the retort 1 so as to form a uniform fluidized bed, it can be used to achieve a satisfactory fluidization without any problem in case of heating of metals for hardening of them at intermediate and low temperatures, and nitriding treatment of them.

However, this gas dispersion nozzle apparatus has the following points at issue in case of heat treatment and cementation treatment at high temperatures, such as, for example, hardening of high-speed-steel.

1. In case of cementation treatment, propane or butane gas or alcohol is mixed into the fluidizing gas to produce a cementation atmosphere, but the cementation atmospherical gases begin to decompose immediately after they have passed through each of the nozzle pipes and emerged out of the nozzle holes. Further, since the retort is heated by a heater, not shown, from the outer periphery thereof, the temperature of the inner side wall portion of the retort becomes more or less higher than that of the central portion thereof. Therefore, the decomposition of gas in the vicinity of the nozzle holes of the nozzle pipes near the inner side wall surface of the retort becomes more violent than that in the central zone thereof. As a result, in case cementation or high carbon cementation is made for an extended period of time, carbon comes to deposit on the internal side wall surface of the retort in vicinity of the nozzle holes. Since a poor fluidization is caused by the deposited carbon, it is necessary to increase the fluidizing gas flow or to effect burn-out frequently after the completion of the treatment to prevent the accurence of poor fluidization, and therefore the treatment operation per se becomes troublesome.

2. Since hardening of high-speed-steel needs to be carried out at a temperature higher than 1,200° C., in case of heating the retort by means of a heater installed outside thereof, it is necessary to effect it carefully so as not to melt or damage the inner side wall surface of the retort. For example, the fluidizing gas flow is somewhat increased to obtain better heat transfer from the retort to the fluidizing particles. However, by so doing, the amount of use of nitrogen gas will increase thus increasing the running cost.

For this reason, according to a second embodiment of the present invention described hereinbelow, there is provided a gas dispersion nozzle apparatus wherein the flow rate of the fluidizing gas in the retort can be controlled in any desired manner and individually in the outer peripheral zone and the central zone thereof, respectively.

The second embodiment of the present invention for achieving the above-mentioned object will be described in detail hereinbelow with reference to FIGS. 8 to 11.

Figure 8:
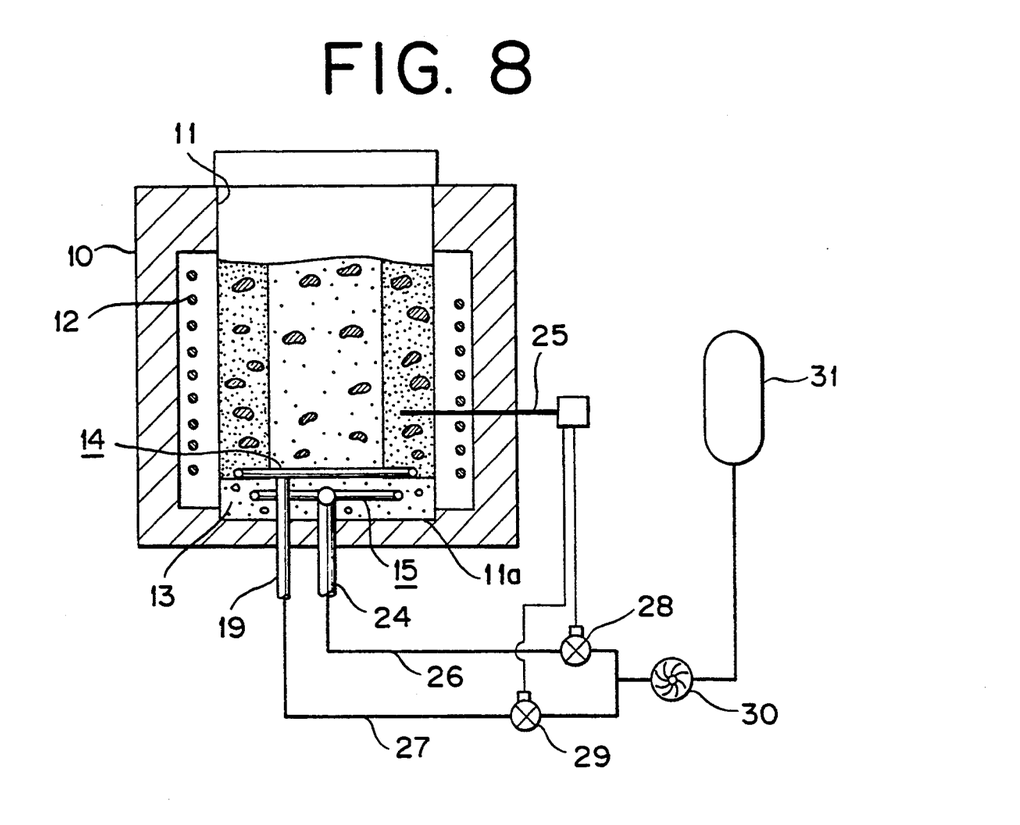
FIG. 8 is a schematic front and longitudinal sectional view of a fluidized bed furnace comprising another embodiment of the gas dispersion nozzle apparatus according to the present invention.

As shown in FIG. 8, a cylindrical retort 11 whose upper end is open is provided in a fluidized bed furnace 10, this retort 11 has a heater 12 mounted on the outer periphery thereof, and a gas dispersion nozzle apparatus 13 mounted on the inner bottom surface thereof.

Figure 9:
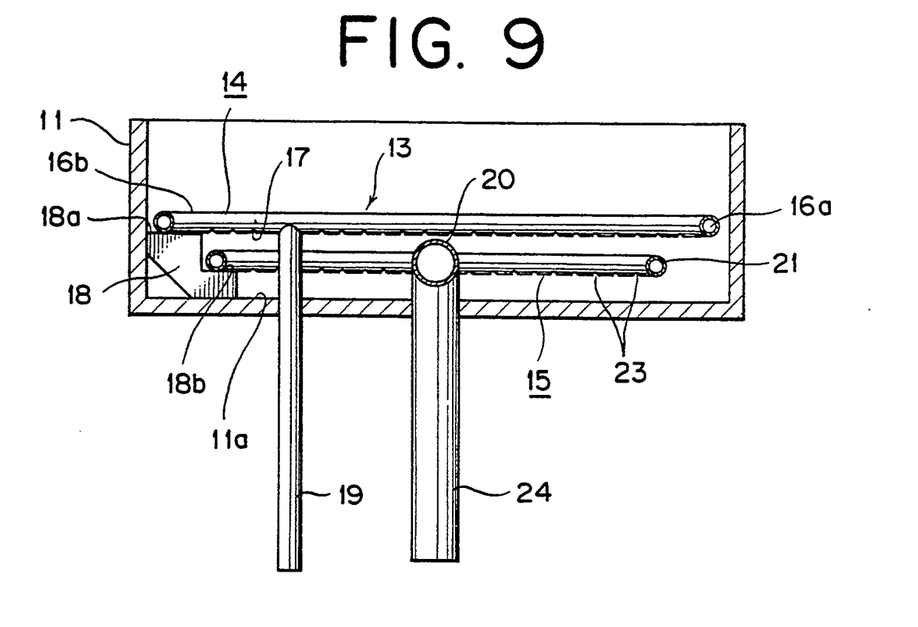
FIG. 9 is a schematic, enlarged front and longitudinal sectional view of the embodiment of the gas dispersion nozzle apparatus shown in FIG. 8.
Figure 10:
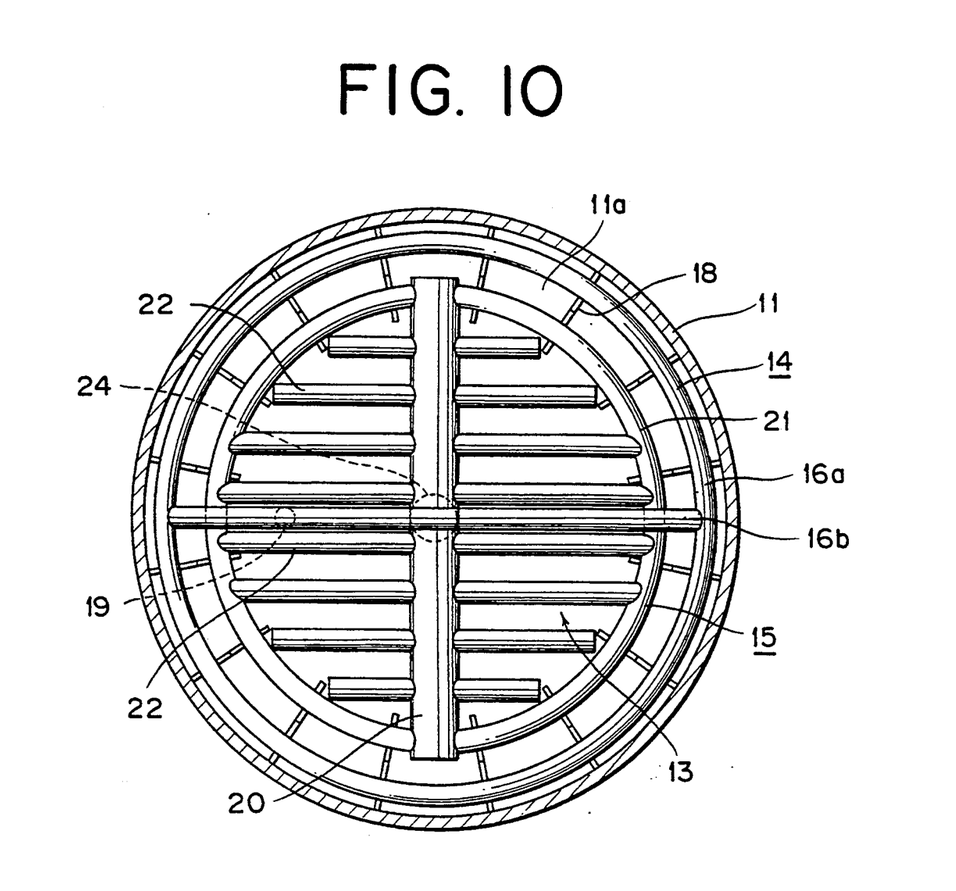
FIG. 10 is a schematic plan view showing the embodiment of FIG. 9, partially in section.

The gas dispersion nozzle apparatus 13 comprises, as shown in FIGS. 9 and 10, a ring-shaped, outer peripheral zone gas dispersion nozzle section 14 and a central zone gas dispersion nozzle section 15, both of which are mounted in parallel relationship with the inner bottom surface of the retort. The outer peripheral gas dispersion nozzle section 14 comprises at least one ring-shaped nozzle pipe 16a having a plurality of downward nozzle holes 17 formed through the lower surface thereof, and a outer peripheral zone connecting pipe 16b for connecting said ring-shaped nozzle pipe 16a with a pipe 19 which extends through the bottom portion of the retort into the latter for supplying a fluidizing gas such as, for example, air or a cementation atmospherical gas into the outer peripheral zone gas dispersion nozzle section 14. The outer peripheral zone gas dispersion nozzle section 14 is mounted on a higher portion 18a of a nozzle bed 18 mounted on the inner bottom surface 11a of the retort 11.

Whilst, the central zone gas dispersion nozzle section 15 comprises a connection pipe 20 of a large diameter extending through the centre of the retort in parallel relationship with the inner bottom surface thereof; at least one ring-shaped nozzle pipe 21 having a plurality of downward nozzle holes formed through the lower surface thereof in the circumferential direction, said ring-shaped nozzle pipe 21 being connected to the connection pipe 20 so as to communicate with the latter; a plurality of nozzle pipes 22 each having a plurality of downward nozzle holes formed through the lower surface thereof, said nozzle pipes 22 extending in parallel relationship with one another and being connected to said pipe 20 of a large diameter at right angles thereto so as to communicate with the latter; and a central zone gas supply pipe extending vertically through the bottom portion of the retort into the latter and being connected to said pipe 20 of a large diameter at the central part thereof so as to communicate with the latter to thereby supply a fluidizing gas into the central zone gas dispersion nozzle section 15. The central zone gas dispersion nozzle section 15 is supported on a lower portion 18b of the nozzle bed through the ring-shaped nozzle pipe 21. The central zone gas dispersion nozzle section 15 is mounted at a lower position than the outer peripheral zone gas dispersion nozzle section 14 so as to avoid therein mutual interference. It is, of course, needless to say that there is no problem if the vertical positional relationship between the outer peripheral zone gas dispersion nozzle section 14 and the central zone gas dispersion nozzle section 15 is reversed to the above-mentioned one.

By making the arrangement as mentioned hereinabove, a fluidizing gas is injected from the outer peripheral zone gas dispersion nozzle section 14 towards the inner bottom surface 11a of the retort 11 near the inner side wall surface thereof, whilst the fluidizing gas is injected from the central zone gas dispersion nozzle section 15 towards the central zone of the inner bottom surface 11a of the retort 11. The injection of the fluidizing gas from the outer peripheral zone gas dispersion nozzle section 14 and the central zone gas dispersion nozzle section 15, respectively, can be controlled independently by means of a fluidizing gas flow-rate controller device which will be described below.

Stating in brief, the flow rate of the fluidizing gas to be injected from the outer peripheral zone gas dispersion nozzle section 14 and that of the fluidizing gas to be injected from the central zone gas dispersion nozzle section 15 can be controlled by detecting the internal temperature of the retort 11 by means of a thermo-coupler 25 installed in the retort 11 as shown in FIG. 8, and controlling flow control valves 28 and 29 installed in gas supply paths 26 and 27 of gas supply pipes 19 and 24, respectively, based on the thus detected temperature.

Further, in FIG. 8, reference numeral 30 denotes a blower, and 31 a fluidizing gas supply source such as, for example, a pressurized gas reservoir or tank. Further, by controlling the flow rate of fluidizing gas, the internal temperature and the side wall temperature of the retort 11 can always be kept approximately constant.

In the prior art arrangement, carbon tends to deposit on the inner surface of the retort 11 in the vicinity of the nozzle holes in case cementation treatment or high carbon content cementation treatment is made for an extended period of time, however, by making arrangement as shown in FIG. 8 so as to increase the fluidizing gas flow in the outer peripheral zone more than that in the central zone, it is possible to reduce the tendency of deposition of carbon and also reduce the number of times of burn-out. Further, even where a small amount of carbon deposits on the inner surface of the retort, the occurrence of poor fluidization can be prevented by increasing the flow rate of the fluidizing gas outer peripheral zone.

Further, in case of high temperature treatments too, the retort 11 can be prevented from melting by increasing the flow rate of the fluidizing gas in the outer peripheral zone in the same way to thereby promote the heat transfer between the retort 11 and the fluidizing bed (which is comprised of alumina particles). In this case, since the flow rate of the fluidizing gas in the central zone may be reduced or weakened slightly, the amount of nitrogen gas to be used as a fluidized gas can be reduced as compared with that in case the flow rates of the gas to be injected from the outer peripheral zone gas dispersion nozzle section and the central zone gas dispersion nozzle section, respectively, cannot be controlled individually, and therefore, the entire fluidizing gas flow through both the outer peripheral zone and the central zone needs to be controlled.

Further, in case the fluidizing gas flow in the central zone becomes poor depending on the method of charging materials to be treated in the fluidized bed furnace (for example, as in the case where a big mass is put in the central zone thereof), it is possible to increase the flow rate of the fluidizing gas only in the central zone in the reverse manner to the above-mentioned to thereby avoid the occurrence of uneven flow of fluidizing gas and speed up the increase in temperature of articles to be subjected to heat treatment.

What we claim is:

1. A gas dispersion nozzle apparatus for use in a fluidized bed furnace with a cylindrical-shaped retort wherein the apparatus includes a gas supply pipe means whose upper end is closed and whose lower end is connected to a pipeline installed outside the bottom portion of the retort and which extends vertically through the central part of the inner bottom surface of the retort; and a gas dispersion pipe means comprising a plurality of nozzle pipes each having a plurality of downwardly directed fluidizing gas nozzles formed along the longitudinal direction thereof, said nozzle pipes including a first nozzle pipe arranged at a radially outermost position of the retort in the vicinity of a side wall surface thereof and a second nozzle pipe arranged radially inside of said first nozzle pipe, said first nozzle pipe being connected to said gas supply pipe means via a first supply circuit so as to communicate with the latter in such a manner that the first nozzle pipe extends to a predetermined position near the inner side wall surface of the retort at a first level spaced away from the inner bottom surface of the retort and in a parallel relationship with the inner bottom surface of the retort, and said second nozzle pipe being connected to said gas supply pipe means via a second supply circuit which is independent of said first supply circuit so as to communicate with the latter in such a manner that the second nozzle pipe extends to a predetermined position within the retort at a second level spaced away from the inner bottom surface of the retort and axially shifted from said first level of said first nozzle pipe;

said gas supply pipe means further comprising a connection pipe extending parallel to the inner bottom surface of the retort, and said dispersion pipe means further comprising a plurality of additional nozzle pipes each having a first end connected to said connection pipe and extending at right angles therefrom and in a parallel relationship with one another such that the outer ends of the additional nozzle pipes extend to a predetermined diameter near said second nozzle pipe.

2. The gas dispersion nozzle apparatus for use in a fluidized bed furnace as claimed in claim 1, wherein said first nozzle pipe comprises at least one ring-shaped pipe having a plurality of downwardly directed gas nozzles formed through the lower surface along the circumference thereof.

3. A gas dispersion nozzle apparatus for use in a fluidized bed furnace, wherein the apparatus includes a central zone gas supply pipe means whose upper end is closed and whose lower end is connected to a pipeline installed outside a bottom portion of the retort and which extends vertically through a central part of the bottom portion of the retort;
- an outer peripheral zone gas supply pipe means whose upper end is closed and whose lower end is connected to a pipeline installed outside the bottom portion of the retort and which extends vertically through the bottom portion of the retort at a position somewhat nearer an inner side wall surface of the retort than the central part of the bottom portion thereof;
- an outer peripheral zone gas dispersion pipe means comprising at least one nozzle pipe having a plurality of downwardly directed gas nozzles formed along the length thereof, said nozzle pipe of the outer peripheral zone gas dispersion pipe means being connected to said outer peripheral zone gas supply pipe means so as to communicate with the latter in such a manner that the nozzle pipe is disposed at a predetermined position near the inner side wall surface of the retort at a level spaced away from an inner bottom surface of the retort and in parallel relationship with the inner bottom surface;
- a center zone gas supply pipe means whose upper end is closed and whose lower end is connected to a pipeline installed outside the bottom portion of the retort and which extends vertically through the bottom portion of the retort at a location nearer the central part of the retort than the inner side wall surface thereof, said center zone gas supply pipe means being independent of said outer peripheral zone gas supply pipe means;
- a central zone gas dispersion pipe means comprising a plurality of nozzle pipes each having a plurality of downwardly directed gas nozzles formed along the longitudinal direction thereof, said nozzle pipes of the central zone gas dispersion pipe means being connected to said central zone gas supply pipe means so as to communicate with the latter in such a manner that they extend to a predetermined intermediate position between the central part of the retort and the outer peripheral zone gas dispersion pipe means at a level spaced away from the inner bottom surface of the retort and in parallel relationship with the inner bottom surface; and
- means for controlling the flow rate of a fluidizing gas to be supplied into said central zone gas supply pipe means and said outer peripheral zone gas supply means, respectively, based on a detected internal temperature of the retort.

4. The gas dispersion nozzle apparatus for use in a fluidized bed furnace as claimed in claim 3, wherein said plurality of nozzle pipes connected to the central zone gas supply pipe means are connected at right angles thereto and in parallel relationship with one another, and are located so as to deviate in position with respect to said nozzle pipe of the outer peripheral zone gas dispersion pipe means in the vertical and horizontal directions to thereby avoid their mutual interference.

5. A gas dispersion nozzle apparatus for use in a fluidized bed furnace as claimed in any one of claims 3 and 4, wherein said nozzle pipe of the outer peripheral zone gas dispersion pipe means is a ring-shaped pipe having a plurality of downwardly directed gas nozzles formed along the circumferential direction thereof in the vicinity of the inner side wall surface of the retort, and said central zone gas dispersion pipe means has also at least one ring-shaped pipe having a plurality of downwardly directed gas nozzles formed along the circumferential direction thereof in an intermediate portion between the central part of the retort and the inner side wall surface thereof.

6. A fluidized bed furnace, comprising:
- a retort having a bottom portion, a cylindrical side wall, a center zone and an outer periphery zone, said outer periphery zone located adjacent said side wall and said center zone located radially within said outer periphery zone;
- a first ring-shaped dispersion pipe having a plurality of downwardly directed gas nozzles, said first dispersion pipe being disposed in said outer periphery zone of the retort;
- a second ring-shaped dispersion pipe having a plurality of downwardly directed gas nozzles, said second dispersion pipe being disposed in said center zone of the retort;
- outer periphery zone gas supply means in communication with said first dispersion pipe for supplying fluidizing gas to the nozzles of said first dispersion pipe;
- center zone gas supply means in communication with said second dispersion pipe for supplying fluidizing gas to the nozzles of said second dispersion pipe; and
- control means for controlling a flow rate of fluidizing gas supplied through said center zone gas supply means separate from a flow rate of fluidizing gas supplied through said outer periphery zone gas supply means.

7. The fluidized bed furnace as set forth in claim 6, wherein the ring shape of said first nozzle pipe has a larger diameter than the ring shape of said second nozzle pipe.

8. The fluidized bed furnace as set forth in claim 7, further comprising additional nozzle pipes disposed in said center zone in fluid communication with said center zone gas supply means.

9. The fluidized bed furnace as set forth in claim 8, further comprising a thermo-coupler located within the retort, and first and second flow control valves associated with said outer periphery zone supply means and said center zone supply means, respectively, said control means separately controlling a flow rate of fluidizing gas through each of said first and second nozzle pipes as a function of a temperature detected by said thermo-coupler.

10. The fluidized bed furnace as set forth in claim 8, wherein said control means selectively provides a higher flow rate of fluidizing gas through said first nozzle pipe than through said second nozzle pipe, and vice versa.

* * * * *